United States Patent [19]
Bartzke et al.

[11] Patent Number: 5,524,354
[45] Date of Patent: Jun. 11, 1996

[54] PROBE ELEMENT FOR COORDINATE MEASUREMENT SYSTEMS

[75] Inventors: Karlheinz Bartzke, Jena; Eberhard Seydel, Neckarbischofsheim; Torsten Antrack, Berlin, all of Germany

[73] Assignee: Carl Zeiss Jena GmbH, Jena, Germany

[21] Appl. No.: 290,887

[22] PCT Filed: Dec. 21, 1993

[86] PCT No.: PCT/EP93/03647

§ 371 Date: Aug. 18, 1994

§ 102(e) Date: Aug. 18, 1994

[87] PCT Pub. No.: WO94/15171

PCT Pub. Date: Jul. 7, 1994

[30] Foreign Application Priority Data

Dec. 21, 1992 [DE] Germany .................. 42 43 284.7

[51] Int. Cl.⁶ .................................................. G01B 17/06
[52] U.S. Cl. ................................................. 33/561; 33/558
[58] Field of Search ........................... 33/561, 556, 557, 33/558, 559, 560; 73/651, 650, 649

[56] References Cited

U.S. PATENT DOCUMENTS

| | | | |
|---|---|---|---|
| 3,888,012 | 6/1975 | Droz | 33/559 |
| 4,397,188 | 8/1983 | Bansevichus et al. | 73/651 |
| 4,578,873 | 4/1986 | Klingler et al. | 33/559 |
| 5,058,433 | 10/1991 | Wilson et al. | 33/556 |
| 5,247,751 | 9/1993 | Ohya et al. | 33/561 |

*Primary Examiner*—Christopher W. Fulton
*Attorney, Agent, or Firm*—McAulay Fisher Nissen Goldberg & Kiel

[57] ABSTRACT

In a probe element for coordinate measuring systems using micro-probe elements and piezo-resonators which change their resonance characteristics upon contact, the probe element has piezo-resonators arranged in a polygonal configuration. Micro-probe elements are arranged in a polygonal configuration on the piezo-resonators and sense inner and outer surfaces in different coordinates. The tactile sensing of the micro-probe elements on the surface of the specimen is effected by measuring the change in the resonance characteristics of the piezo-resonators.

18 Claims, 5 Drawing Sheets

PROBE ELEMENT FOR COORDINATE MEASUREMENT SYSTEMS

BACKGROUND OF THE INVENTION a) Field of the Invention

The invention is directed to a probe element for coordinate measuring systems which can be used in particular for surface analysis or three-dimensional measurement of very small test pieces or specimens.

b) Description of the Related Art

It is known to carry out mechanical sensing with the aid of a probe ball (Neumann, H. J, Koordinatemneβtechnik, Bibliothek der Technik, volume 41, Verlag moderne Industrie, Munich 1990). Such probe elements have the advantage that all points on their surface maintain a constant distance from the center and they can also be manufactured with great accuracy. Deviations in shape between probe balls are approximately 0.3 µm. However, it is disadvantageous that the measurement results must be corrected for many measuring tasks, e.g. internal and external measurements, since it is not possible to carry out tactile sensing with the center of the probe ball. The point at which the probe ball contacts the surface of the specimen must be known in order to carry out corrections. Since this point is not known, such measurements always involve some error however slight. The dimensions of the probe balls are too large for measuring very small specimens. Another disadvantage consists in that contacting forces of 0.1 to 1 N at the specimen, probe ball and probe ball holder result in deformations leading to errors which cannot always be compensated.

Further, the lateral resolution capacity of a ball may not be favorable because measurement is effected along a spot or area having a diameter upward of a hundredth of a millimeter, rather than on a measurement point, owing to the curvature of the spherical surface and the flattening caused by the measuring force. Consequently, the measured value represents a mean value obtained along this spot or area.

For the reasons described above, measurement errors of less than 1 µm and measurements on very small specimens, e.g. with inner diameters of less than 1 mm, cannot be realized with probe bails.

Measurement signals are obtained with spherical probe balls in that a resiliently supported plate is tilted due to the tactile sensing movement. This opens an electrical contact which triggers acquisition of the measurement signal. This process enables dynamic measurements to be obtained from the movement, but it is not very accurate. Therefore, more recent spherical probes have a stem connected with piezo-resonators which react to pressure and allow higher switching accuracy.

A further increase in measuring accuracy can be achieved by outfitting the probe head with its own three-dimensional precision adjustments, precision measuring systems and adjustable measurement force devices. In this way the probe ball can sense the surface of the specimen while the probe head remains stationary and the probe ball can be guided for short distances along the surface (scanning).

The disadvantages connected with the probe ball and contacting forces persist in spite of these refinements.

Optical probe elements for coordinate measurement are also known (Gussek, B., Bartel, R., Hoffmann, W., "Ein Mikrotaster erfaβt berührungslos Profile im optischen Tastschnitt", Feinwerktechnik und Meβtechnik 98 (1990) 10, pages 401–405). Probe elements of this type are primarily used with soft specimens. Their advantages consist in that they measure without contact and without exerting force and, in contrast to the ball, the location of the optical contact point is known.

A geometric triangulation method has a resolution of less than 0.1 µm in the vertical direction. However, measurement errors of up to several micrometers can result from the optical characteristics of the surface of the test specimen.

An autofocussing method such as that mentioned above requires surfaces with sufficient reflectivity and also has measurement errors of up to several micrometers depending on reflectivity. The diameter of the light beam or focus is several micrometers and limits the lateral resolution capability of these systems. Conventional methods for tactile sensing of surfaces in coordinate measurement techniques are unsuitable for measurement tasks requiring a lateral resolution capability and measurement errors of less than 1 µor measurement lengths of less than 1 mm for internal measurements. Thus, conventional three-dimensional measurement techniques cannot be used for measuring teeth with modules of less than 0.01 mm, bore holes with diameters of less than 1 mm, threads of less than M1 and test specimens in micromechanics.

Further, arrangements are known in which surface structures are measured by micro-probe needles and piezo-resonators. However, these arrangements are not suitable for purposes of three-dimensional measurement technique, since a three-dimensional measurement head does not appear practical for the measuring elements described in these arrangements. The contact between the oscillating needle fastened to the piezo-resonator and the surface of the test specimen is determined by measuring either the change in the resonator parameters or the contact forces (DE-OS 4035076.2, DE-OS 4035084.2).

OBJECT AND SUMMARY OF THE INVENTION

A primary object of the present invention is to develop a probe element for coordinate measuring systems which enables internal measurements of less than 1 mm with a measurement accuracy of less than 0.1 µm and lateral resolutions of less than 10 nm with a defined punctiform contact and measurement forces of less than $10^{-8}$ N and whose dimensions are smaller than those commonly used in prior coordinate measuring systems by a factor greater than $10^3$ owing to the size of its probe element.

In accordance with the present invention, a probe element has piezo-resonators arranged in a polygonal pattern and micro-probe elements which are attached to the piezo-resonators in a polygonal configuration and which detect inner and outer surfaces in different coordinates. The tactile sensing of the micro-probes on the surface of the specimen is effected by detecting the change in the resonance parameters of the piezo-resonators.

In a specific form of the invention, the micro-probe elements arranged at the piezo-resonators are advantageously made of hard materials such as diamonds or glass balls.

Further, the piezo-resonators are advantageously constructed as tuning-fork oscillators, torsional oscillators or longitudinal oscillators. Advantageously dimensioned torsional or longitudinal oscillators have cross sections of approximately 100–1000 µ$^2$ with a length of 100–1000 µm.

Depending on the measurement task, the piezo-resonator may be advantageously formed by a plate-shaped element having tuning-fork oscillators, torsional oscillators or longitudinal oscillators which are oriented so as to be offset from one another by 90° when four are provided, by 120° when three are provided or by 60° when six are provided. As a result of using a plurality of micro-probes, at least one micro-probe element contacts the surface of the specimen to be measured. Contact is determined by measuring the change in the resonance parameters or in the contact forces, as is known per se. In order to accurately define the points of contact, the position of the micro-probe on the contact element must be known. A calibration method which is also known in conventional spherical probe elements and makes use of a calibrating ball which can be applied for this purpose.

A defined punctiform contact is realized by means of the design of the probe element with the use of micro-probe elements. At the same time, the tactile sensing forces are reduced by a factor of $10^{10}$ to $10^{-8}$ N compared with conventional sensing by ball probes.

Since the oscillation amplitudes of the resonators range from angstroms to nanometers depending on the geometric shape, it is important to be able to evaluate a prior warning signal in order to guarantee a reliable approach to the surface. Known arrangements and processes may be employed for this purpose. For example, an additional optical indicator can be used. The acoustic coupling effects operating in the air medium between the microprobe element and the surface of the test specimen with gap widths in the micrometer range can also be utilized as prior warning signals. They also cause a change in the resonance parameters of the piezo-resonator.

The probe element, according to the invention, for coordinate measuring systems will be explained more fully in the following with reference to embodiment examples.

DESCRIPTION OF THE PREFERRED EMBODIMENTS

Figure 1:
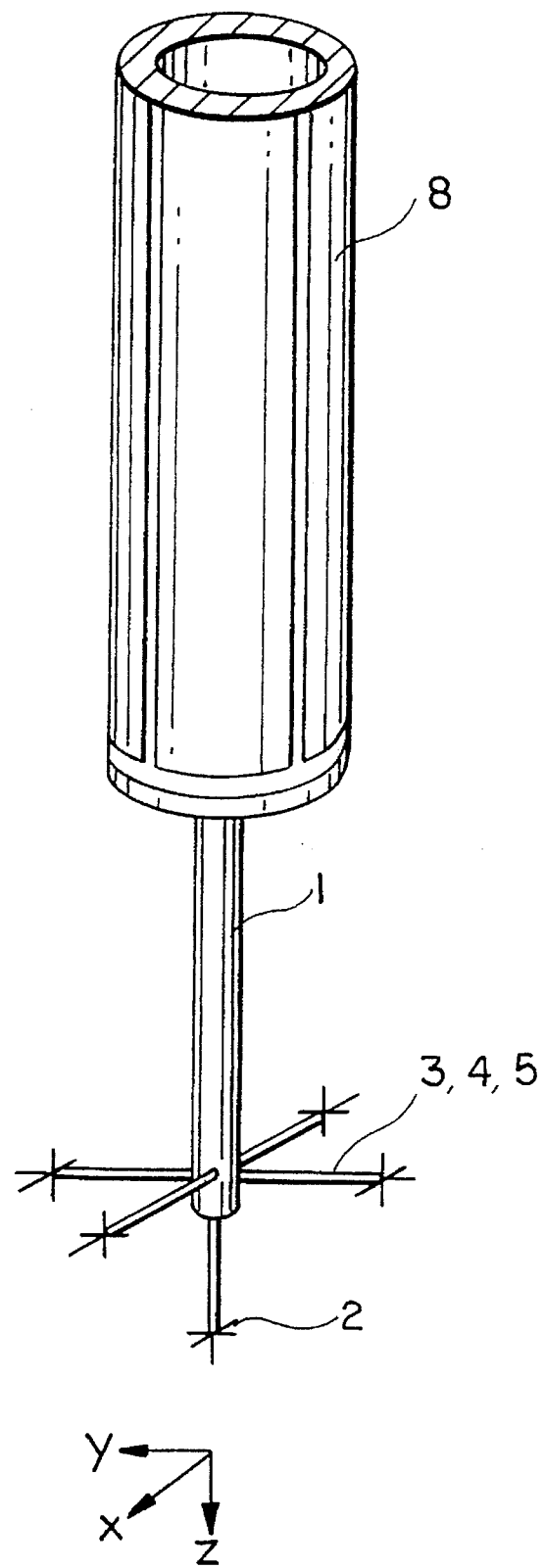
FIG. 1 shows a three-dimensional probe element.

FIG. 1 shows the probe element according to the invention having five piezo-resonators 3, 4, 5 arranged in a polygonal pattern at a rod 1. Polygonal micro-probe elements 2 are arranged at the piezo-resonators 3, 4, 5. The approach of the probe element to the surface of the specimen is effected in a known manner by means of a piezo-tube 8 with attached control electrodes.

The piezo-tube 8 which is made of piezo-ceramic material and has attached control electrodes has a length of approximately 20 mm and an outer diameter of approximately 2 mm. The control electrodes arranged on the outer and inner cylindrical surface of the piezo-tube 8 are electrically conductive and separated so as to form identical shell-like control electrodes which can be acted upon by the same control voltage or different control voltages by means of control electronics, not shown. When identical control voltage is applied to the control electrodes, identical electrical errors occur between the inner and outer electrodes in the piezo-tube which, depending on the mathematical sign and magnitude of the control voltage, lead to an elongation or compression of the piezo-tube in the direction of the z axis of the cylinder due to the reciprocal transverse piezoelectric effect.

An additional piezoelectric bending of the piezo-tube in the x and y directions occurs when the control electrodes are acted upon by different voltages so that the surface segments of the piezoelectric tube undergo various degrees of elongation or compression in the z direction which cause a bending of the piezo-tube 8. By using this known method, the probe element according to the invention, which is fastened to the end face of the piezo-tube, can be adjusted precisely within a three-dimensional measurement region of approximately 100 ×100 μm in the x, y directions, and approximately 10 μm in the z direction and the high-resolution tactile sensing of the specimen surface can be effected.

If greater adjusting paths are required (e.g. in the millimeter range), the piezo-tube or the specimen are measurably displaced in x, y, z coordinates by means of known mechanical adjusting devices.

The micro-probe elements 2 which are arranged in a polygonal pattern have dimensions in the range of approximately 100 nm to 10 mm, whereas the dimensions of the piezo-resonators 3, 4, 5 range from 10 μm to 10 mm depending on the field of application. The piezo-resonators 3, 4 and 5 are advantageously made of piezoelectric quartz which enables high oscillating quality, high resonant frequencies in the range of 0.1 to 10 MHZ, low time constants of 1 μs to 1 ms and low tactile sensing forces of 0.1 to 100 nN given suitable orientation, oscillator geometry and exciter electrode design.

In order to measure complicated specimen geometries such as are common in micromechanics, the micro-probe elements 2 can be connected with the piezo-resonator via passive connection elements 6, e.g., in the form of cones or rods whose dimensions are adapted to the micro-probe elements 2 depending on application. They can be metallic or nonmetallic.

It is of critical importance for the operation of the tactile sensing process of the probe element according to the invention on the specimen that all mechanical elements used in the sensing process have a high mechanical self-resonance of greater than 10 kHz. Under these conditions, the measurement process is extensively unaffected by disturbing mechanical environmental vibrations.

The sensing of the specimen surface is effected in a known manner in that the micro-probe elements 2 oscillating with the piezo-resonators 3, 4 or 5 in the frequency range mentioned above change the resonance of the piezo-resonator 3, 4 or 5 with respect to frequency, phase or amplitude when approaching or contacting the specimen. These changes in resonance can be measured electronically in a known manner and can be used either to switch off the approach process between the specimen and micro-probe element 2 or to advance the oscillating micro-probe element 2 toward the surface of the specimen in a controlled manner.

Figure 2:
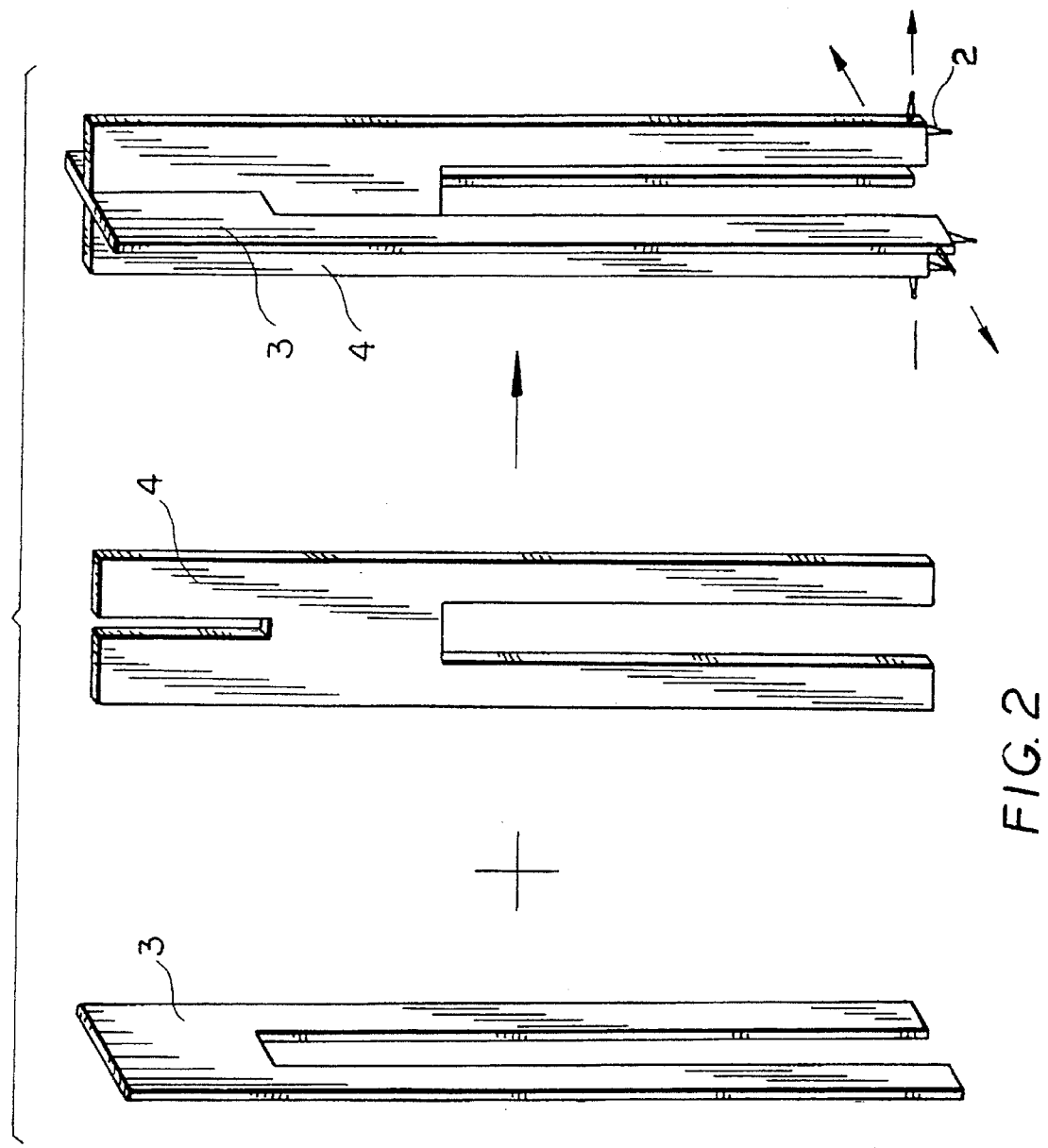
FIG. 2 shows a three-dimensional probe element with piezo-resonator in the form of a tuning fork oscillator arrangement.

FIG. 2 shows a piezo-resonator in the form of a tuning fork oscillator arrangement serving as a probe element. A piezo-resonator is obtained by guiding one tuning fork oscillator 3, 4 into another tuning fork oscillator 3, 4. Each tuning fork oscillator 3 and 4 is outfitted with at least one micro-probe element 2.

Due to the different lengths of the tuning forks of the tuning fork oscillators 3 and 4, which result in different resonant frequencies, it is simple to allocate the tactile sensing signal to a pair of diametrically opposed microprobe elements 2. Such embodiment forms can be used for internal measurements as well as for external measurements.

Since piezo-resonators can be manufactured with very small dimensions by means of photolithography, they can be used to measure bore hole walls with diameters of less than 1 mm. The length of the tuning fork pairs oscillating relative to one another by means of an appropriate design of the exciter electrodes can be approximately 1 mm. Overtone oscillators having an additional oscillating node approximately midway between the prongs of the tuning fork have resonant frequencies of approximately 1 MHz.

Figure 3:
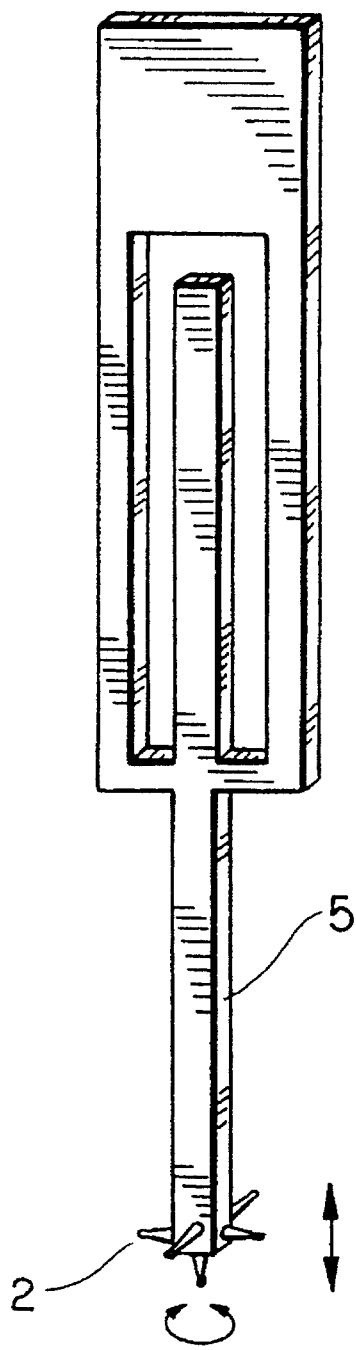
FIG. 3 shows a three-dimensional probe element with piezo-resonator in the form of a torsional or longitudinal oscillator.

FIG. 3 shows a three-dimensional probe element having piezo-resonators in the form of a torsional or longitudinal oscillator 5 which is provided with at least one micro-probe element 2. Due to the small mass of the micro-probe elements 2, the resonance characteristics are not impaired. The advantage of such constructions consists in that they enable tactile detection in three coordinates for each rod oscillator in addition to a particular compact construction.

The torsional or longitudinal oscillator 5 is supported in its center in the oscillation node.

Figure 4:
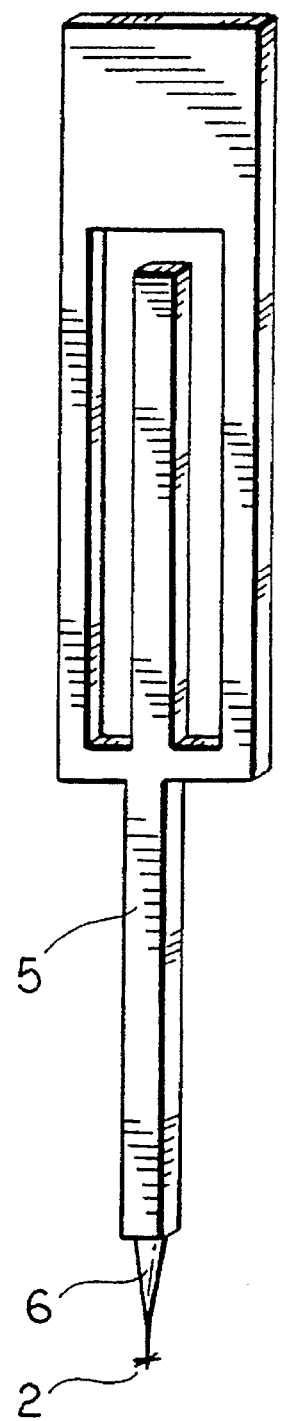
FIG. 4 shows a three-dimensional probe element with piezo-resonator in the form of torsional or longitudinal oscillators with passive connection element.

FIG. 4 shows a three-dimensional probe element comprising piezo-resonators in the form of torsional or longitudinal oscillators 5 with micro-probe elements 2 in a polygonal arrangement. A passive connection element 6 is interposed between the torsional or longitudinal oscillator 5 and the micro-probe elements 2. Micro-probe elements 2 in a polygonal arrangement are located at the connection element 6. This type of configuration of the probe element is particularly suitable for measuring very small internal dimensions, wherein tactile sensing can be carried out in three coordinates for each probe element.

The very small inner dimensions at the specimens which can be detected in this way depend only on the geometry of the micro-probe elements 2 in the polygonal arrangement and not on the geometry of the torsional or longitudinal oscillator 5. Internal measurements in the sub-micrometer range can be carried out with this probe element when micro-probe elements 2 having a diameter of approximately 100 nm are used.

Figure 5:
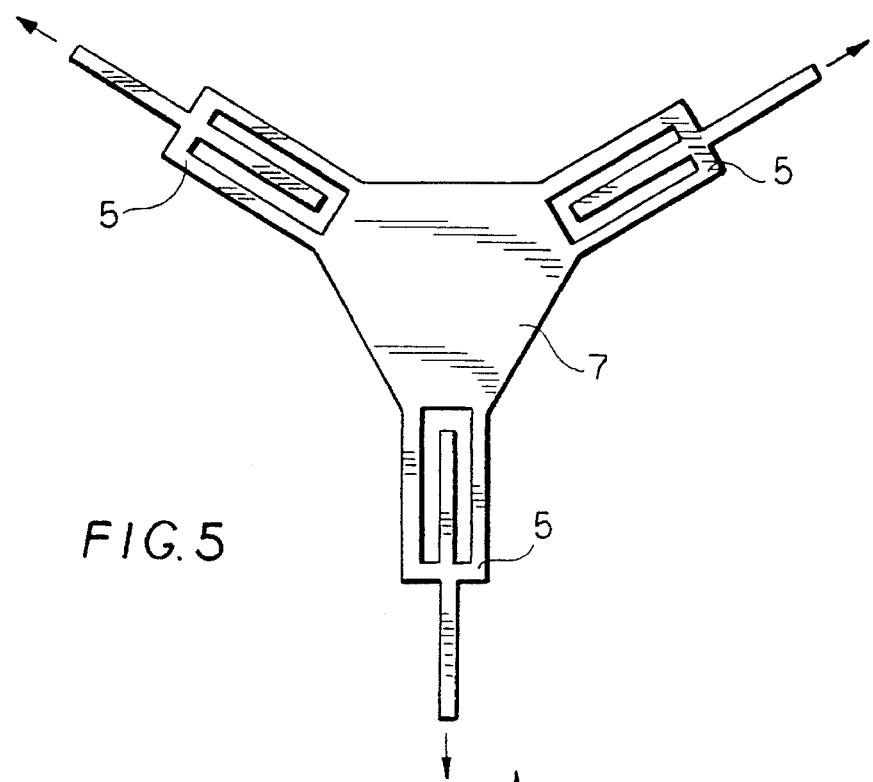
FIG. 5 shows a three-dimensional probe element (triple)
Figure 6:
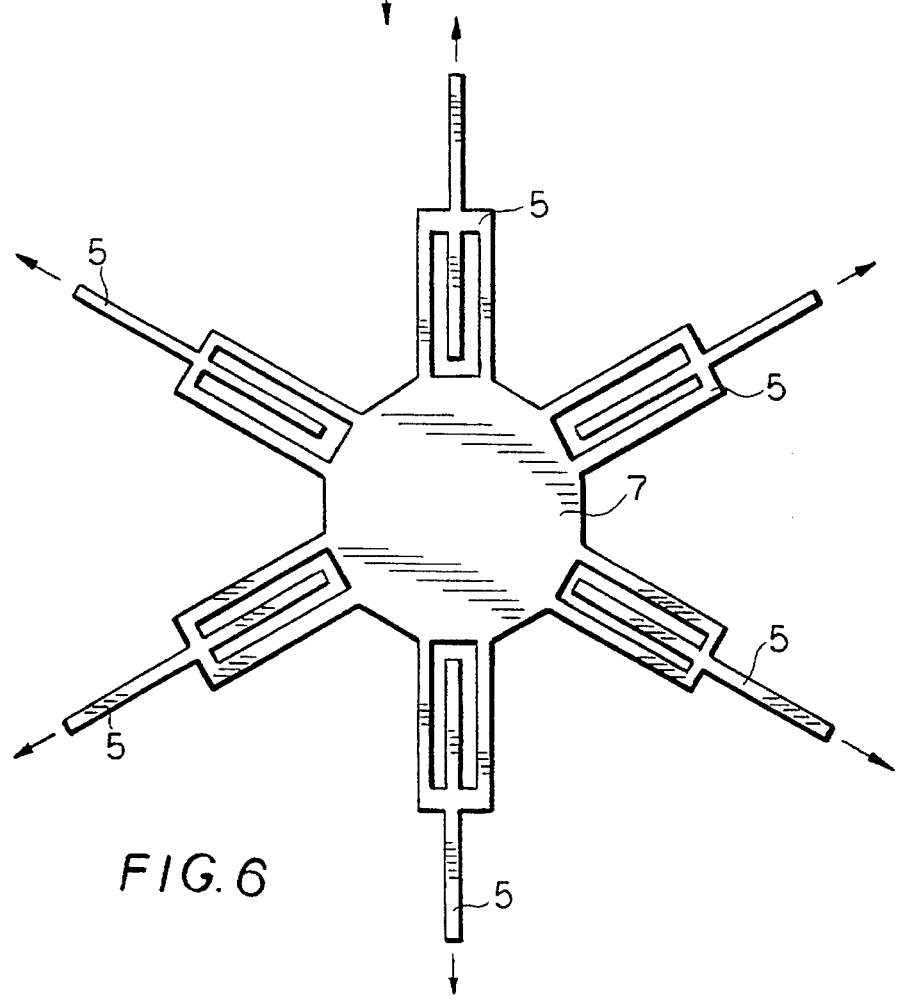
FIG. 6 shows a three-dimensional probe element (sextuple)
Figure 7:
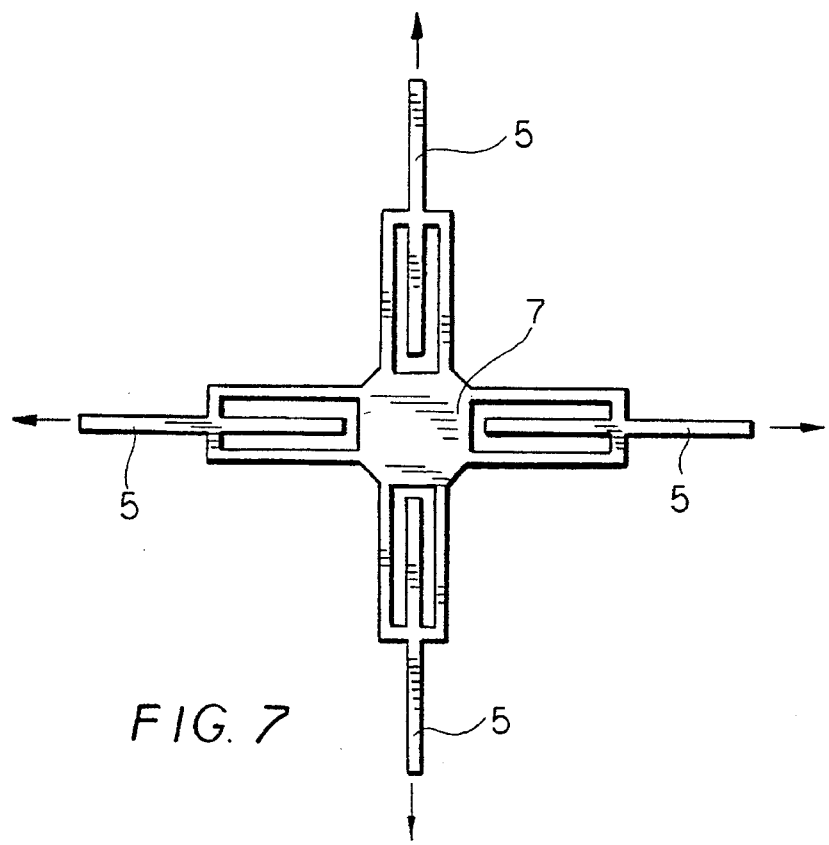
FIG. 7 shows a three-dimensional probe element (quadruple)

FIGS. 5, 6 and 7 show embodiment forms of the probe element in which three rod oscillators or tuning fork oscillators 5 which are offset by 120° (FIG. 5), six rod oscillators or tuning fork oscillators 5 which are offset by 60° (FIG. 6) or four rod oscillators or tuning fork oscillators 5 which are offset by 90° (FIG. 7) can be obtained from a plate-shaped element 7 due to the crystallographic properties of piezoelectric materials such as quartz or lithium niobate. Microprobe elements 2, not shown in the figures, are arranged at these oscillators 5.

These embodiment forms of the probe elements offer the advantage that a polygonal arrangement of piezo-resonators 3 or 5 can be achieved on the piezoelectric wafer. The cost of assembly and adjustment in manufacturing the probe elements is considerably reduced. The dimensions of these probe elements correspond to those described with reference to FIG. 1.

Figure 8:
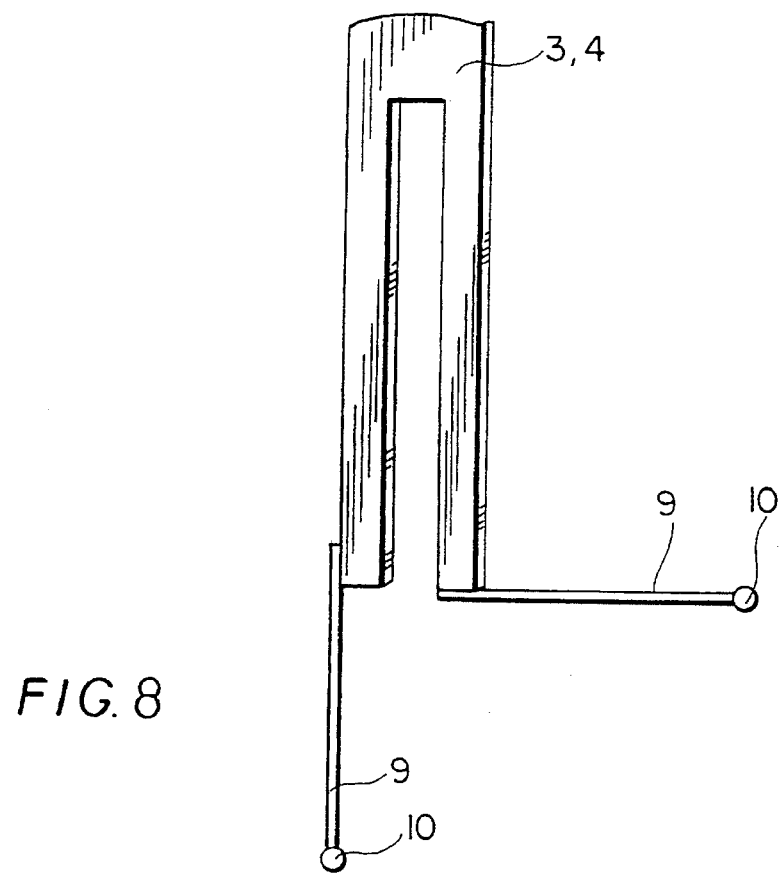
FIG. 8 shows a three-dimensional probe element with micro-probe elements formed by glass fibers and miniature balls.

FIG. 8 shows a micro-probe element 2 formed by glass fibers and miniature balls. The glass fiber 9 can have a diameter of approximately 30 μm and a length of 3 mm depending on the field of application. The front end of the glass fiber 9 is fused to a miniature ball 10. The miniature ball 10 has a diameter of 100 μm, for example.

While the foregoing description and drawings represent the preferred embodiments of the present invention, it will be obvious to those skilled in the art that various changes and modifications may be made therein without departing from the true spirit and scope of the present invention.

What is claimed is:

1. A probe element for coordinate measurement systems using micro-probe elements and piezo-resonators which change their resonance characteristics upon contact, comprising:

a plurality of piezo-resonators being arranged in a polygonal configuration; and each said piezo resonator having a plurality of microprobe elements arranged in a polygonal configuration which sense inner and outer surfaces in different coordinates, and wherein tactile sensing of the micro-probe elements on the surface of a specimen is effected by means for measuring the change in the resonance characteristics of the piezo-resonators.

2. The probe element according to claim 1, wherein the micro-probe elements are made from diamonds.

3. The probe element according to claim 1, wherein the piezo-resonators are constructed as rod oscillators.

4. The probe element according to claim 1, wherein tuning fork oscillators which are nested one inside the other are used as piezo-resonators, said micro-probe elements being arranged in a polygonal configuration on the tuning fork oscillators.

5. The probe element according to claim 1, wherein piezo-resonators in the form of torsional oscillators are used.

6. The probe element according to claim 1, wherein the piezo-resonators in the form of longitudinal oscillators are used.

7. The probe element according to claim 1, wherein the piezo-resonators are quarter-wave oscillators.

8. The probe element according to claim 3, wherein the piezo-resonator is formed by a plate-shaped element which has three oscillators which are oriented so as to be offset by 120°.

9. The probe element according to claim 3, wherein the piezo-resonator is formed by a plate-shaped element which has six oscillators which are oriented so as to be offset by 60°.

10. The probe element according to claim 3, wherein the piezo-resonator is formed by a plate-shaped element which has four oscillators which are oriented so as to be offset by 90°.

11. The probe element according to claim 3, wherein the passive connection element arranged between the piezo-resonator and micro-probe element narrows in diameter toward the micro-probe elements.

12. The probe element according to claim 1, wherein the micro-probe elements are formed by glass fibers with miniature balls fused to their ends.

13. The probe element according to claims 8, 9 or 10, wherein at least one oscillator is a rod oscillator.

14. The probe element according to claims 8, 9 or 10, wherein at least one oscillator is a tuning fork oscillator.

15. The probe element according to claim 13, wherein all the oscillators are rod oscillators.

16. The probe element according to claim 14, wherein all the oscillators are tuning fork oscillators.

17. The probe element according to claim 13, wherein the oscillators include at least one rod oscillator and at least one tuning fork oscillator.

18. The probe element according to claim 13, wherein the oscillators include at least one rod oscillator and at least one tuning fork oscillator.

\* \* \* \* \*